(12) United States Patent
Poole et al.

(10) Patent No.: US 7,063,134 B2
(45) Date of Patent: Jun. 20, 2006

(54) COMBINED MUFFLER/HEAT EXCHANGER

(75) Inventors: Wallace J. Poole, Michigan Center, MI (US); James R. Abbott, Jackson, MI (US); Gabriel A. Kuschel, Stockbridge, MI (US); Jian Guo Hua, East Lansing, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/876,242

(22) Filed: Jun. 24, 2004

(65) Prior Publication Data
US 2005/0284623 A1 Dec. 29, 2005

(51) Int. Cl.
F28D 7/02 (2006.01)
F01N 7/08 (2006.01)

(52) U.S. Cl. .................. 165/163; 165/135; 181/248

(58) Field of Classification Search ............... 165/134, 165/135, 152, 154, 155, 156, 163; 181/248, 181/249, 255, 269, 270, 272, 211, 212
See application file for complete search history.

(56) References Cited

U.S. PATENT DOCUMENTS

| | | | |
|---|---|---|---|
| 1,231,208 A | | 6/1917 | Semmler |
| 1,556,934 A | * | 10/1925 | Hilldring .................... 181/274 |
| 1,884,538 A | | 10/1932 | Blake |
| 1,993,397 A | * | 3/1935 | Berg et al. .................. 181/248 |
| 2,083,516 A | * | 6/1937 | Horton ....................... 181/211 |
| 2,343,152 A | * | 2/1944 | Marx ......................... 181/249 |
| 2,919,540 A | | 1/1960 | Percival |
| 2,940,538 A | * | 6/1960 | Billey ........................ 181/249 |
| 3,280,903 A | * | 10/1966 | Stoddard, Jr. ............... 165/135 |
| 3,339,260 A | | 9/1967 | Burne et al. |
| 3,691,772 A | | 9/1972 | Cross |
| 3,930,476 A | | 1/1976 | Koch |
| 4,095,575 A | | 6/1978 | Wulf |
| 4,373,354 A | * | 2/1983 | Sawyer ...................... 62/238.6 |
| 4,391,235 A | | 7/1983 | Majkrzak |
| 4,424,775 A | | 1/1984 | Mayfield, Jr. et al. |
| 4,426,844 A | | 1/1984 | Nakano |
| 4,450,932 A | | 5/1984 | Khosropour et al. |
| 4,537,349 A | | 8/1985 | Stolz |
| 4,685,430 A | | 8/1987 | Ap |
| 4,777,796 A | | 10/1988 | McEachern, Jr. |
| 4,781,242 A | | 11/1988 | Meijer et al. |

(Continued)

OTHER PUBLICATIONS

Drawing No. 0515-003, Derksen Air, Inc., May 16, 2003.

*Primary Examiner*—Tho Duong
(74) *Attorney, Agent, or Firm*—Harness, Dickey & Pierce, P.L.C.

(57) ABSTRACT

A combined muffler and heat exchanger apparatus is provided. The apparatus includes a housing defining a heat transfer chamber and an acoustic attenuation chamber separated by a partition. A flow regulator and a fluid transport member are disposed within the heat transfer chamber. The flow regulator is adapted to regulate the flow of a first fluid, such as a heat source, between an input end of the housing and the partition. The fluid transport member is adapted to contain the flow of a second fluid. An acoustic regulator is disposed in the acoustic attenuation chamber and extends longitudinally from the partition to an output end of the housing. The acoustic regulator is a metal tube including a plurality of apertures adapted to attenuate exhaust stream acoustics associated with an automotive vehicle power source.

9 Claims, 1 Drawing Sheet

U.S. PATENT DOCUMENTS

| | | |
|---|---|---|
| 4,805,403 A | 2/1989 | Bowman et al. |
| 4,911,110 A | 3/1990 | Isoda et al. |
| 4,923,033 A | 5/1990 | Panick et al. |
| 5,147,987 A * | 9/1992 | Richardson et al. ........ 181/264 |
| 5,321,215 A * | 6/1994 | Kicinski ..................... 181/211 |
| 5,551,384 A | 9/1996 | Hollis |
| 5,724,931 A | 3/1998 | Hollis |
| 5,799,632 A | 9/1998 | Bennett |
| 5,915,619 A | 6/1999 | Etheve |
| 6,089,465 A | 7/2000 | Habijanec et al. |
| 6,164,553 A | 12/2000 | Derksen |
| 6,536,679 B1 | 3/2003 | Baeuerle et al. |
| 6,702,190 B1 | 3/2004 | Nohl et al. |
| 2003/0085071 A1* | 5/2003 | Boast et al. ................ 181/249 |

* cited by examiner

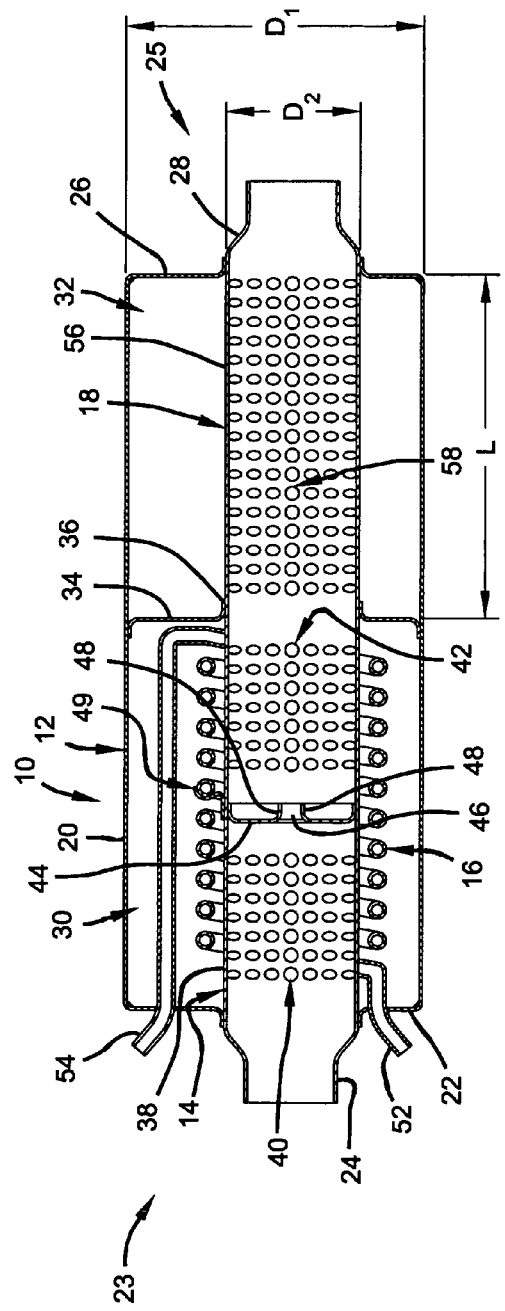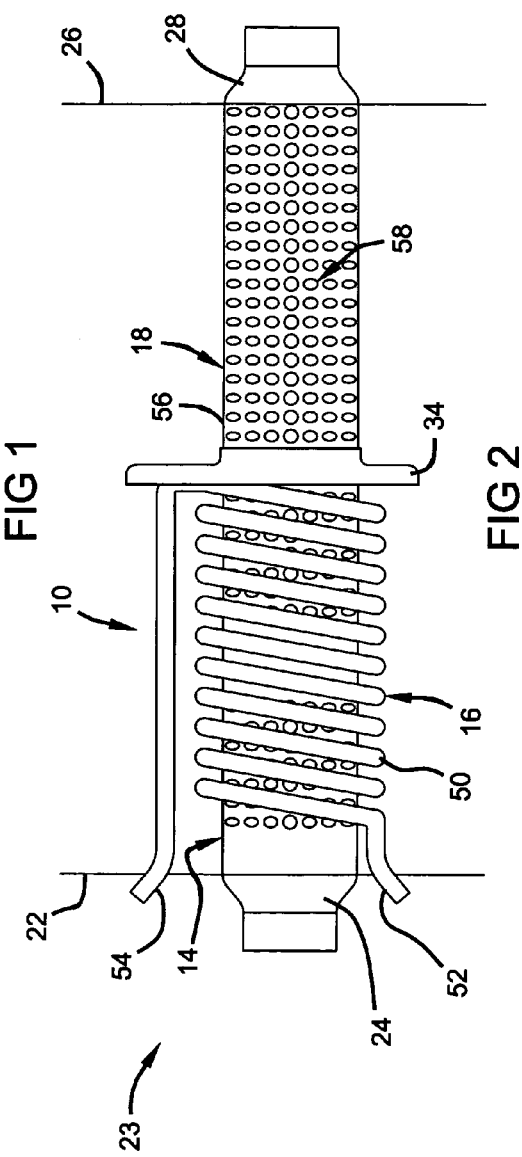

COMBINED MUFFLER/HEAT EXCHANGER

FIELD OF THE INVENTION

The present invention relates to exhaust systems, and more particularly, to a combined muffler and heat exchanger apparatus for use in an exhaust system.

BACKGROUND OF THE INVENTION

At present, there are no readily effective means to utilize waste heat from an exhaust stream of an internal combustion engine to augment a climate control system of a vehicle and simultaneously provide acoustic attenuation. Currently, fuel operated heating systems known in the art as "hot boxes" or "booster heaters" are provided to create auxiliary heat. "Hot boxes" are typically stand alone systems configured in series with a coolant system. These devices independently create heat by burning fuel, and therefore, cause an increase in total fuel consumption. Furthermore, "hot boxes" include jetted burners and air blowers that tend to increase noise levels inside the cabin of the vehicle.

SUMMARY OF THE INVENTION

A combined muffler and heat exchanger apparatus includes a housing defining a heat transfer chamber and an acoustic attenuation chamber separated by a partition. A flow regulator extends axially through the heat transfer chamber and has first and second perforated portions separated by a restrictor plate. The flow regulator is adapted to regulate flow of a first fluid. An acoustic regulator extends axially through the acoustic attenuation chamber and has a plurality of apertures adapted to attenuate a magnitude of a predetermined band of acoustical frequencies associated with the first fluid. A fluid transport member is disposed in the heat transfer chamber and contains flow of a second fluid and is adapted to convey heat from the first fluid to the second fluid.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a cross-sectional side view of an exemplary embodiment of a combined muffler and heat exchanger apparatus in accordance with the present invention; and FIG. 2 is a side view of the combined muffler and heat exchanger apparatus of FIG. 1 with the housing shell removed.

DETAILED DESCRIPTION

The following description of the preferred embodiment(s) is merely exemplary in nature and is in no way intended to limit the scope of the invention, its application, or its uses.

With reference to FIGS. 1 and 2, combined muffler and heat exchanger apparatus 10 arranged in accordance with the principles of the present invention is described. The combined muffler and heat exchanger apparatus 10 includes a housing 12, a flow regulator 14, a fluid transport member 16 and an acoustic regulator 18. The housing 12 includes a cylindrical shell 20, an input header 22 located at an input end 23, and an output header 26 located at an output end 25. The cylindrical shell 20 defines a heat transfer chamber 30 and an acoustic attenuation chamber 32 separated by a partition 34. The heat transfer chamber 30 is adjacent the input header 22 and the acoustic attenuation chamber 32 is adjacent the output header 26. In an alternative exemplary embodiment, the opposite relationship is true. The cylindrical shell 20 is constructed of metal and each of the headers 22, 26 are annular shaped metal plates welded to the input and output ends 23, 25 of the cylindrical shell 20, respectively. Similarly, the partition 34 is an annular shaped metal plate welded to the inner wall of the shell 20. It should be appreciated that while the housing 12 has been disclosed to include a cylindrical shell 20, any shape shell 20 is intended to be within the scope of the present invention.

The flow regulator 14 includes a metal tube 38 extending longitudinally through the heat transfer chamber 30 from the input end 23 of the housing 20 to the partition 34. The flow regulator 14 is adapted to contain and regulate the flow of a first fluid, such as an exhaust fluid from an internal combustion engine. The flow regulator 14 includes a first perforated portion 40 and a second perforated portion 42 separated by a restrictor plate 44. The restrictor plate 44 is a metal plate welded to an inner wall of the metal tube 38 and includes an aperture 46 for allowing at least a portion of the first fluid to flow therethrough. The restrictor plate 44 includes rounded edges 48 defining the aperture 46 to help decrease turbulence in the flow of the first fluid.

The fluid transport member 16 is a hollow coil 50 having an inlet portion 52 and an outlet portion 54 and is adapted to contain the flow of a second fluid. Coil 50 is preferably constructed of a metal having a high thermal conductivity and the second fluid is a heat recovery fluid such as an engine coolant. The inlet and outlet portions 52, 54 extend from the input end 23 of the housing 12 and are adapted to be connected in series with a vehicle climate control system. In an alternative embodiment, the inlet and outlet portions 52, 54 of the fluid transport member extend from the output end 25 of the housing 12. A flange bracket 49 attaches a mid-region of the fluid transport member 16 to the flow regulator 14 to provide structural integrity.

The acoustic regulator 18 includes a metal tube 56 extending longitudinally through the acoustic attenuation chamber 32 from the partition 34 to the output end 25 of the housing. The acoustic regulator 18 is adapted to receive the first fluid from the heat transfer chamber 30 through the aperture 36 in the partition 34. The acoustic regulator 18 further includes a plurality of apertures 58 for attenuating acoustics associated with the exhaust stream of an internal combustion engine. The magnitude and frequency of these acoustics are a function of the engine's operating characteristics. Such characteristics include cylinder firing frequency, number of cylinders, valve arrangement, operating load and speed conditions. The physical characteristics of the acoustic regulator 18 and acoustic attenuation chamber 32 can be tuned or altered to attenuate different aspects of the acoustics. For example, the longitudinal dimension L of the acoustic attenuation chamber 32 is directly related to the frequencies attenuated. Therefore, increasing the longitudinal dimension L of the acoustic attenuation chamber 32 provides for the attenuation of lower frequencies. In addition, the ratio of the diameter $D_1$ of the acoustic attenuation chamber 32 to the diameter $D_2$ of the acoustic regulator 18 is related to the magnitude of the attenuation. Thus, increasing the ratio increases the magnitude of the attenuation or damping of the acoustics at a given frequency.

It should be appreciated that in an exemplary embodiment, the flow regulator 14 and acoustic regulator 18 are constructed of a single, continuous metal tube. The metal tube extends between and is fixed to the input and output headers 22, 26. In addition, the metal tube includes an input flange 24 and an output flange 28. The input and output flanges 24, 28 are reduced cross-sectional areas extending from the input and output ends 23, 25 of the housing 12, respectively, adapted to couple the combined muffler and heat exchanger apparatus 10 in series with a vehicle exhaust system. In an alternative exemplary embodiment, the flow regulator 14, acoustic regulator 18, and input and output flanges 24, 28 are each separate components fixed together by welds or other fastening means.

During operation, a constant stream of exhaust from an internal combustion engine flows through the combined muffler and heat exchanger apparatus 10 from its input end 23 to its output end 25. Contemporaneously, a constant stream of heat recovery fluid flows through the fluid transport member 16 from the inlet portion 52 to the outlet portion 54. As the exhaust stream enters the input end 23 of the housing 12, it is contained within the first perforated portion 40 of the flow regulator 14. As the exhaust stream reaches the restrictor plate 44, at least a portion of it is deflected out of the flow regulator 14 through the first perforated portion 40. Any remaining exhaust flows through the aperture 46 in the restrictor plate 44. However, the exhaust stream that was forced out of the flow regulator 14 flows within the heat transfer chamber 30 adjacent to the fluid transport member 16. The exhaust stream thereby heats the fluid transport member 16 and the heat recovery fluid carried therein. The rate at which the heat is transferred to the fluid depends on the characteristics of the exhaust stream and the heat recovery fluid. For example, the heat transfer rate is generally proportional to the mass flow rate and temperature of the exhaust stream. In addition, the heat transfer rate is generally inversely proportional to the velocity of the heat recovery fluid flowing through the fluid transport member 16. Finally, the heat recovery fluid reaches the outlet portion 54 of the fluid transport member 16 and is carried to the vehicle climate control system. The heat recovery fluid can then be used to provide heat to a vehicle cabin or an auxiliary device such as a water heater.

Meanwhile, the portion of the exhaust stream flowing adjacent the fluid transport member 16 re-enters the flow regulator 14 via the second perforated portion 42. The stream then flows through the aperture 36 in the partition 34 and into the acoustic regulator 18. Subsequently, the stream flows into the acoustic attenuation chamber 32 via the plurality of apertures 58 in the flow regulator 18. The acoustic attenuation chamber 32 serves to attenuate the acoustics carried with the exhaust stream in the manner described above. Finally, the exhaust stream re-enters the acoustic regulator 18 via the plurality of apertures 58 and exits the output end 25 of the housing 12. The plurality of apertures 58 in the acoustic regulator 18 function to force the exhaust stream out of the acoustic regulator 18 and into the acoustic attenuation chamber 32. The ratio of the total area of the plurality of apertures 58 to the cross-sectional area of the acoustic regulator 18 is related to the rate at which the exhaust stream exits the acoustic regulator 18. Generally, a change in this rate has little effect on acoustic attenuation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A combined muffler heat exchanger apparatus comprising:
    a housing defining a heat transfer chamber and an acoustic attenuation chamber separated by a partition;
    a flow regulator comprising a metal tube extending axially through the heat transfer chamber having a first perforated portion and a second perforated portion separated by a metal restrictor plate welded to an inner wall of the metal tube, the flow regulator operative to regulate flow of a first fluid;
    an acoustic regulator extending axially through the acoustic attenuation chamber having a plurality of apertures operative to attenuate a magnitude of a predetermined band of acoustical frequencies associated with the first fluid; and
    a fluid transport tube disposed in the heat transfer chamber containing flow of a second fluid and operative to convey heat from the first fluid to the second fluid.

2. A combined muffler heat exchanger apparatus comprising:
    a housing defining a heat transfer chamber and an acoustic attenuation chamber separated by a partition;
    a flow regulator tube for regulating flow of a first fluid through the heat transfer chamber and extending axially through the heat transfer chamber and having a first perforated portion and a second perforated portion separated by a restrictor plate coupled to, and extending annularly inwardly from, an inner surface of the flow regulator tube to an aperture in the plate; and
    a fluid transport coil disposed inside the heat transfer chamber and containing flow of a second fluid for receiving heat from the first fluid.

3. The apparatus of claim 2 wherein the flow regulator tube is metal.

4. The apparatus of claim 2 wherein the restrictor plate includes rounded edges defining the aperture adapted to decrease turbulence in the flow of the first fluid therethrough.

5. The apparatus of claim 2 wherein the first fluid is an exhaust stream produced by an automotive vehicle power source.

6. The apparatus of claim 2 wherein the housing is a metal cylinder.

7. The apparatus of claim 6 wherein the partition is an annular shaped metal plate welded to an inner wall of the housing.

8. The apparatus of claim 2 wherein the second fluid is a heat recovery fluid.

9. The apparatus of claim 2 wherein the fluid transport coil is metal.

* * * * *